Nov. 30, 1965

G. A. STORY 3,220,649

PNEUMATIC TEMPERATURE CONTROL SYSTEM

Filed Jan. 20, 1964

INVENTOR.
GEORGE A. STORY
BY
Alfred N. Feldman
ATTORNEY

United States Patent Office 3,220,649
Patented Nov. 30, 1965

3,220,649
PNEUMATIC TEMPERATURE CONTROL SYSTEM
George A. Story, Elk Grove Township, Cook County, Ill., assignor to Honeywell Inc., a corporation of Delaware
Filed Jan. 20, 1964, Ser. No. 338,798
7 Claims. (Cl. 236—38)

The present invention is broadly directed to a pneumatic temperature control system for unit ventilators wherein three modes of operation are provided in response to three different main pressures supplied to the overall control system. The invention specifically entails utilizing the three pressures supplied in the system without the addition of any piping beyond the normal pipes utilized in a normal day and night type of system utilizing two separate and distinct control pressures. The two pressure system is a system wherein one pressure is supplied to a pneumatic control system at night to provide a lowered temperature with no circulation of outside air, followed by switching to daytime occupancy with a second pressure wherein a higher temperature and circulation of outside air is encompassed. The present invention utilizes the same connections and basic equipment but provides for a third function known as morning pickup or a day unoccupied cycle. This day unoccupied cycle or morning pickup is a time in which the higher or daytime temperature is maintained but the pneumatic control system of the unit ventilator keeps the unit ventilator's outside damper closed so that no fresh air is supplied to the area being controlled.

In the present invention the three phases of occupancy or temperature, and air or damper settings are obtained by the utilization of a conventional control system with the addition of a dual pressure to electric relay means that sequences the system depending on the pressure supplied to the mains.

It is a primary object of the present invention to disclose a pneumatic temperature control system in which a dual pressure to electric relay senses a desired condition and operates a unit ventilator to comply with one of three modes of operation.

A further object of the present invention is to convert conventional unit ventilators operating on a two cycle or two mode basis to a three mode basis.

A further object of the present invention is to disclose a pneumatic temperature control system which more economically utilizes existing equipment and conserves the air conditioning media supplied in a space so that a minimum of waste energy occurs.

These and other objects will become apparent when the drawings of the present application are considered in detail.

Figure 1:
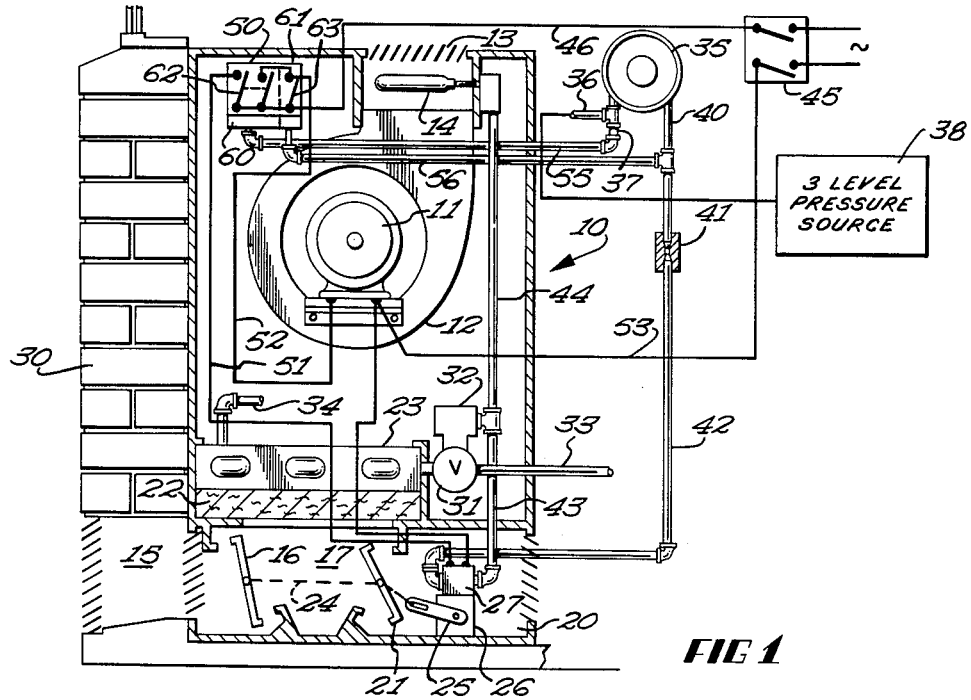
FIGURE 1 is a combination schematic and pictorial representation of a unit ventilator incorporating the inventive control system of the present application when utilized with a conventional day-night pneumatic thermostat and when supplied with a heating media such as hot water.

In the disclosure of FIGURE 1 a unit ventilator is disclosed pictorially at 10. The unit ventilator includes an electric motor 11 that drives a fan 12 to force air through a grill covered opening 13 across a secondary control bulb 14. The air supplied to fan 12 enters from an outside air path means 15 past a damper plate 16 into an air chamber 17. Air to fan 12 is also supplied from an inside air path 20 across a damper plate 21 into the chamber 17. From the chamber 17 the air passes upward through a filter 22 across a heat exchanger 23 where the air is tempered, as will be subsequently explained. The damper plates 16 and 21 are connected by a linkage 24 that is shown schematically which in turn is connected to a lever arm 25 on a damper motor 26. The damper motor 26 has a pneumatic-electric control valve 27 mounted thereon to supply an electrical control of the pneumatic pressure that operates the damper motor 26. The damper plates 16 and 21, along with the linkage 24, and the arm 25 with the damper motor 26 and the pneumatic-electric valve form broadly damper means that control the flow of both the return air path and the outside air path in a fashion that is conventional in unit ventilator devices. The details of the linkage and position of the damper plates 16 and 21 are not particularly material except as to the overall function of the unit ventilator 10 as will be pointed out subsequently.

The unit ventilator 10 is mounted adjacent an outside building wall 30, which has been shown as a matter of convenience in orienting the disclosure to its normal surroundings. The unit ventilator 10 further has mounted within it a valve 31 that is operated by a pneumatic actuator 32 in the overall control system, as will be pointed out in detail. In the device disclosed in FIGURE 1, the valve 31 is connected to an inlet pipe 33 that has hot water, in a normal heating application, supplied. The water entering pipe 33 passes to the heat exchanger 23 to temper the air flow from chamber 17 through the fan 12 to supply the air to the outlet 13. The hot water passes to an outlet pipe 34.

To complete the broad overall description of the system a pneumatic thermostat is shown at 35, and may be of a type disclosed in the Mott patent 2,828,077, issued March 25, 1958. The pneumatic thermostat is of a conventional day-night type wherein two pressures can be supplied to the thermostat to cause it to operate at two different set points. This type of thermostat is well known in the art and its structure will not be described in connection with the present application beyond the fact that at a lower of two pressures the thermostat operates at a daytime setting whereas at a higher of two settings the thermostat operates at what is known as an unoccupied or night time setting. A three level pneumatic source 38 is connected to an inlet pipe 36 that is supplied to connection means 37 which will be described in more detail subsequently. The thermostat 35 controls the air supplied from pipe 36 and has an outlet pipe 40 which in turn is connected to an orifice 41 which regulates the flow of control air via pipe 42 to the pneumatic electric valve 27. The pipe 42 thus supplies pneumatic pressure to the pneumatic damper motor 26 and also to a pipe 43 that in turn is connected to the pneumatic actuator 32 of valve 31. A pipe 44 in turn supplies a pneumatic pressure to the secondary sensing bulb or control 14. The function of the control bulb 14 is a safety device and operates in a conventional fashion.

Electrical energy is supplied through switch means 45 to a conductor 46 through a dual pressure to electric relay means 50. The dual pressure to electric relay means will be described in detail in connection with this invention as it forms a key part of the control circuit. The electric power from conductor 46 is supplied through the switching of the dual pressure to electric relay means 50 to conductors 51 and 52 under appropriate control which in turn supply electrical energy to the motor 11 and the pneumatic electric valve 27 of the damper means of the device. A return conductor 53 is supplied back to the switch means 45 to complete the electric circuit for the device. It is apparent from considering the electric circuit that when power is supplied through switch means 45 to the dual pressure to electric relay means 50 that the motor 11 can be energized or that the motor 11 can be energized in combination with the energization of the valve 27 mounted on top of the pneumatic actuator 26.

In order to complete the disclosure of the device prior to the discussion of the operation, two pipes 55 and 56 are disclosed connected between the connection means 37 and the pipe 40, respectively. Pipe 55 is connected to the left-hand side 60 of the dual pressure to electric relay means 50 while pipe 56 is connected to the right hand portion 61 of the relay means 50. The portion 60 of the relay means contains a double pole, signal throw switch 62 that is responsive to a fixed pressure level. The portion 61 of the relay has a single pole, single throw switch 63 that is responsive to a different pressure level than the portion 60. It will be noted that when the switch 63 is closed electric energy is supplied to the motor 11 only thereby blowing air through the unit ventilator 10. When the switch 62 is closed, electric energy is supplied to both the motor 11 and to the pressure electric valve 27 mounted on the pneumatic actuator 26. As such, it becomes apparent that when the relay portion 60 is closed both the fan and the relay 27 are operating together whereas when switch 63 is closed only the fan 11 is in operation.

*Operation*

During the night or unoccupied time, the air pressure supplied to main or pipe 36 is, for example, 21 p.s.i. The thermostat 35 controls at its lower temperature setting which is normally adjustable from 0 to 20° Fahrenheit below the daytime setting. The dual pressure to electric relay means 50 has both of its switches 62 and 63 open, stopping the motor 11 and breaking the electric circuit to pneumatic valve 27, which causes the damper plate 16 to close completely and in turn opens the return air damper 21 fully. The linkage 24 is mechanically set so that at one extreme of operation the damper 16 will be closed when damper 21 is wide open. At this time hot water is supplied to pipe 33 which water in turn flows to valve 31 and with the electric pneumatic valve 27 de-energized, the pressure in pipe 43 is such that the pneumatic actuator 32 operates a valve 31 to a full open position. This allows hot water to circulate through the heat exchanger 23. Since the fan 12 is not operating, little or no air circulates through the unit except by normal convection and this does not substantially affect the thermostat 35. When the room temperature falls below the night temperature control point, the thermostat 35 controls the pressure on pipe 40 to reduce it to the point where the section 61 of the dual pressure to electric relay means 50 operates by allowing switch 63 to close. The closing of switch 63 in no way affects switch 62 which remains open. The closing of switch 63 supplies power to the fan motor 11 which in turn operates fan 12 to circulate return air through the device until the thermostat 35 is satisfied. When the thermostat 35 is satisfied the pressure on pipe 40 is increased to 21 p.s.i. once again and the switch 63 opens. This completes the normal night operation of the device. It is thus obvious that the thermostat 35, when combined with the dual pressure to electric relay means 50, operates only with return air at the normal night time operating point.

When it becomes necessary to warm the area up for daytime occupancy, the second step or phase of operation occurs. The pressure to pipe 36 is reduced to, for example, 16 p.s.i. This changes the room thermostat control point to the normal day setting. The pressure of 16 p.s.i. to thermostat 35 lowers the pressure on pipe 40 to at least the 16 p.s.i. setting which then energizes section 61 of the relay means 50. Switch 63 closes and the fan 12 is energized to circulate air with the return air damper 21 open but the outside air damper 16 closed. As soon as the thermostat 35 has been satisfied at the higher temperature requirement, the pressure in pipe 40 is changed so as to operate the pressure to electric relay means 50 to open switch 62 to remove electric power from motor 11 of fan 12. At the 16 p.s.i. setting, the damper actuator 26 remains fixed.

When normal daytime operation is desired, it is merely necessary to reduce the pressure to pipe 36 to, for example, 13 p.s.i., the normal daytime pressure for the system. By reducing the pressure on pipe 36 to 13 p.s.i. the connection means 37 immediately channels this pressure through pipe 55 to the left section 60 of the dual pressure to electric relay means 50. This lower pressure of 13 p.s.i. allows the switch 62 to close regardless of what function occurs at switch 63. The closing of switch 62 immediately supplies electric power to both the motor 11 and to the pressure to electric valve 27 thereby supplying pneumatic pressure to the actuator 26 to operate the linkage 24 and open the damper 16 to the outside air while tending to close the damper 21 to the return air. At pressures below 13 p.s.i., the damper motor 26 modulates to position dampers 16 and 21. The position of the dampers 16 and 21 is a function of the construction of the unit and they assume a position that varies with the modulation of the pneumatic actuator 26 along with the pressure supplied on pipe 40 through the restriction 41 and pipe 42 in a normal control fashion, that is well known in this type of art. At the application of the 13 p.s.i. pressure to pipe 36, the device operates in a normal daytime fashion controlling in a modulating manner both the inside and outside air through the unit ventilator along with the temperature of this mixture of air flows.

Briefly, the system just described has three modes of operation. The first mode is a night time operation wherein a low night time temperature is maintained with no addition of outside air. A second control phase occurs during morning warmup or the pickup period wherein the pressure to the system has been reduced so that the thermostat operates at a normal daytime temperature, but the pressure has not been reduced sufficiently to allow the damper mechanism to open the outside air inlet. The third mode of operation is to maintain the daytime temperature, but the reduction in control pressure allows the system to operate as a normal daytime system mixing both return air and outside air through the unit ventilator. With the arrangement disclosed it is merely necessary to add the dual pressure to electric relay means 50 having two different pressure levels or settings wherein the first setting allows for operation of only the fan, whereas the second setting allows for both operation of the fan and the pressure to electric switch that activates the pneumatic actuator 26 to control the outside and inside air mixture. The arrangement thus disclosed requires only two pipes from the thermostat to the unit ventilator in the same fashion as has been conventional in a day-night unit ventilator operation. In FIGURE 1, one of the internal piping runs has been shown external to the unit ventilator 10 for convenience in explanation. This eliminates the need of a third control pipe from the thermostat, which is normally mounted a good distance remote from the unit ventilator device itself. The reduction in cost of the piping more than offsets the cost in the utilization of the special dual pressure to electric relay that is mounted within the unit ventilator. The unit ventilator is substantially conventional and the addition of the dual pressure to electric relay means 50 adds little in the way of cost and is small enough to be added to the conventional unit ventilator without any modification of existing equipment.

Figure 2:
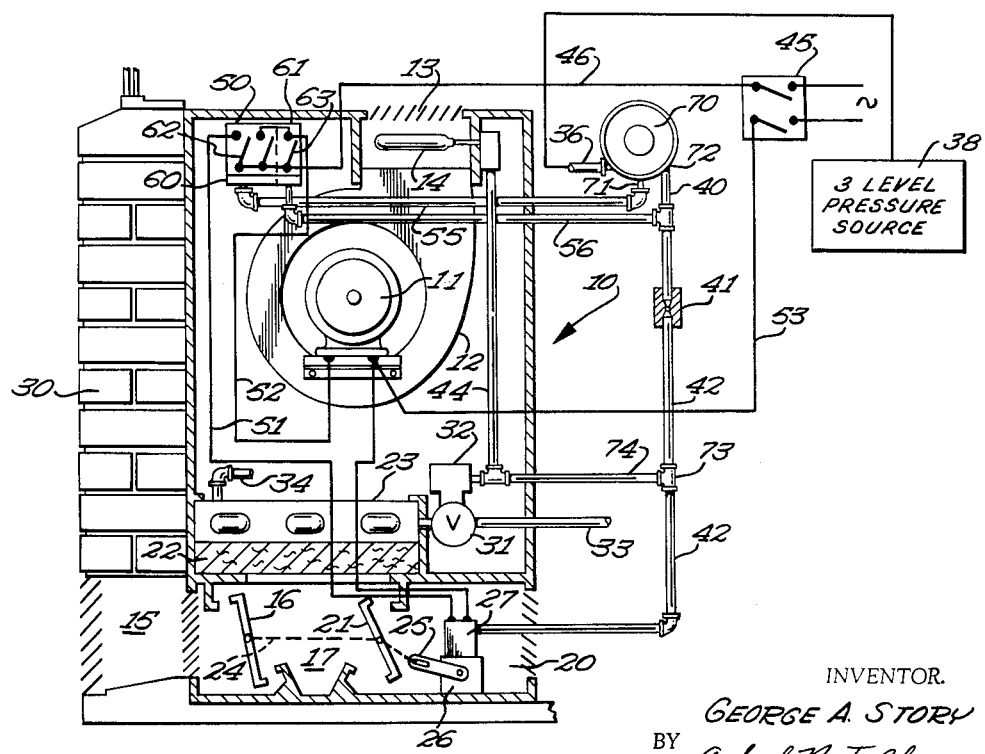
FIGURE 2 is similar to FIGURE 1 except a different type of day-night thermostat having a slightly different configuration is disclosed in a system that utilizes steam as the heating media.

In FIGURE 2 there is disclosed a substantially similar unit ventilator control that utilizes a different type of thermostat and which utilizes steam as a heating media rather than hot water. The differences will be outlined without a discussion of the similar or identical parts to that contained in FIGURE 1. The numbering of FIGURE 2 will correspond in almost all respects with FIGURE 1, and only the variations in the parts and function will be mentioned. Thermostat 70 is utilized in this particular embodiment wherein the inlet pipe 36 supplies the pressure from a source (not shown). The thermostat 70 has two outlets 71 and 72. Outlet 71 is normally referred to as the sub-main and is utilized where day operation during night setback is to be accomplished at thermostat 70 rather than at the remote point of the source of pressure to pipe 36. The thermostat 70 is of a conventional type which has been marketed for some time by the assignee of the present invention. The thermostat, by having sub-main 71, allows for an individual at the thermostat 70 to adjust the thermostat at any time when the night setback is in operation to adjust the thermostat to a daytime opertion by switching a manual lever (not shown) at the thermostat 70. Since this is a commercially available product no further details will be included in the present discussion. The sub-main outlet 71 is connected to pipe 55 and performs the same function as in FIGURE 1. The outlet 72 is connected to pipe 40 which in turn is connected to the restriction 41 and to pipe 56 in the same fashion as FIGURE 1. The pipe 42, however, is connected by a T 73 to a continuation of pipe 42 and to an additional piping 74 that goes directly to the pneumatic actuator 32 of valve 31. The pipe 74 is connected to pipe 44. It is thus obvious that the control piping to the valve actuator 32 and to the pressure to electric valve 27 has been altered. The reason for this alteration is that the disclosure of FIGURE 2 is one in which steam is utilized as supplied to pipe 33 and valve 31. Where steam is utilized, the valve 31 must be closed during the non-heating or dormant portion of the control cycle since the flow of steam through the heat exchanger 23 would generate an excess amount of heat if the fan 12 were not operating. As such, by connecting the actuator 32 directly to the secondary control 14 and the pipe 42 without passing through the electric to pneumatic valve 27, the valve 31 closes whenever the pressure in the system is such that the blower 12 is inoperative. It will be noted that all of the balance of the structure is the same as FIGURE 1.

In operation, a 21 p.s.i. pressure is supplied to pipe 36 for night time operation. The pressure is controlled by thermostat 70 and is in turn supplied to sub-main 71 directly. The output of the thermostat 70 is connected to pipe 40 through the outlet 72 and thereby controls the pneumatic actuator 32 to open the valve 31 whenever the thermostat is calling for heat. It will be noted that at this same time the pressure on pipe 56 closes the switch 63 thereby energizing the motor 11 to operate fan 12 and circulate the air through the unit ventilator. The pressure to electric valve 27 is de-energized and therefore no energy of a pneumatic nature is supplied from pipe 42 to the pneumatic actuator 26 to operate the linkage 24. As such, the linkage 24 keeps the damper plates 16 closed while the damper plate 21 is fully open.

If someone occupies the room where thermostat 70 is located and desires the daytime temperature as opposed to the night time temperature, a manual switch on thermostat 70 can be altered thereby reducing the pressure through the thermostat 70 to a point where the equipment appears to be operating at normal daytime pressures. This puts the unit ventilator in a full daytime operation, as will be outlined below.

When it becomes desirable to warm the area up in the morning hours before the ventilation requirement occurs, the pressure to pipe 36 is dropped to 16 p.s.i. This activates switch 63 along with the pneumatic control of the actuator 32 to open the valve 31 sufficiently to supply steam to the heat exchanger 23 so that the fan 12 can circulate warm air through the unit. The pressure to electric relay 27 still remains de-energized thereby keeping the damper 16 closed and the damper plate 21 open. At the time when the normal daytime occupancy occurs, the pressure on pipe 36 is reduced to 13 p.s.i. thereby activating the switch 62 to place the pressure electric relay 50 into operation thereby supplying pneumatic pressure to the actuator 26. The actuator 26 then operates the damper plate 16 and 21 to their intermediate position supplying a mixture of outside and return air through the device. At the same time the valve 31 is modulated by pneumatic actuator 32 to temper the air flow across the heat exchanger 23 to the normal daytime temperature.

The various modes of operation have been described in considerable detail. The specific pressures outlined are typical of pressures utilized in existing installations and form no limitations on the operation of the present system. They have been specifically mentioned as they are the pressures which are used with the commercially available equipment now in use.

The disclosures of FIGURES 1 and 2 show the combination of two different types of thermostats and the use of two different types of thermostats and the use of two different types of tempering media. These thermostats could be interchanged and the media interchanged depending on the type of unit ventilator installation being utilized. It becomes obvious that many modifications can be made in the present disclosure that would be well within the scope of the invention. As such, the applicant wishes to be limited in scope only by the appended claims.

I claim:

1. A pneumatic temperature control system for a unit ventilator, including: a unit ventilator having a valve controlling an air conditioning media flow; damper means to control a flow of air from a return air path and an outside air path through said unit ventilator to utilize said media flow to temper said air flow; a pneumatic thermostat having an inlet connected to a three level source of air pressure; said thermostat further having a sub-main outlet and a controlled air outlet; a dual pressure to electric relay having a first pressure responsive section connected to said sub-main outlet; said relay means having a second pressure responsive section connected to said controlled air outlet; said air outlet connected to said valve and said damper means to operate said damper means and said valve; a first air pressure from said source to said thermostat inlet operating said thermostat and said relay means jointly controlling said damper means so that said outside air path is closed while said thermostat controls said tempered air flow at a first temperature; a second air pressure from said source to said thermostat inlet operating said thermostat and said relay means jointly controlling said damper means so that said outside air path is closed while said thermostat controls said tempered air flow at a second temperature; and a third pressure from said source to said thermostat inlet operating said thermostat and said relay means jointly controlling said damper means so that a mixture of return and outside air flows through said unit ventilator while said thermostat controls said tempered air flow at said second temperature.

2. A pneumatic temperature control system for unit ventilator means, including: unit ventilator means having valve means controlling an air conditioning media flow; damper means to control a flow of air from return air path means and outside air path means through said unit ventilator means to utilize said media flow to temper said air flow; pneumatic thermostat means having an inlet connected to a three level source of air pressure; said thermostat means further having a sub-main outlet and a controlled air outlet; relay means having a first pressure responsive section connected to said sub-main outlet; said said relay means having a second pressure responsive section connected to said controlled air outlet; said air outlet connected to said valve means and said damper means to operate said damper means and said valve means; a first air pressure from said source to said thermostat inlet operating said thermostat means and said relay means to control said damper means so that said outside air path means is closed while said thermostat means controls said tempered air flow at a first temperature; a second air pressure from said source to said thermostat inlet operating said thermostat means and said relay means to control said damper means so that said outside air path means is closed while said thermostat means controls said tempered air flow at a second temperature; and a third pressure from said source to said thermostat inlet operating said thermostat means and said relay means to control said damper means so that a mixture of return and outside air flows through said unit ventilator means while said thermostat means controls said tempered air flow at said second temperature.

3. A pneumatic temperature control system for a unit ventilator, including: a unit ventilator having a valve controlling an air conditioning media flow; damper means to control a flow of air from a return air path and an outside air path through said unit ventilator to utilize said media flow to temper said air flow; a pneumatic thermostat having an inlet with connection means connected to a three level source of air pressure; said thermostat further having a controlled air outlet; a dual pressure to electric relay having a first pressure responsive section connected to said source of air pressure; said relay having a second pressure responsive section connected to said controlled air outlet; said air outlet connected to said valve and said damper means to operate said damper means and said valve; a first air pressure from said source to said thermostat and said relay jointly controlling said damper means so that said outside air path is closed while said thermostat controls said tempered air flow at a first temperature; a second air pressure from said source to said thermostat and said relay jointly controlling said damper means so that said outside air path is closed while said thermostat controls said tempered air flow at a second temperature; and a third pressure from said source to said thermostat and said relay jointly controlling said damper means so that a mixture of return and outside air flows through said unit ventilator while said thermostat controls said tempered air flow at said second temperaure.

4. A pneumatic temperature control system for unit ventilator means, including: unit ventilator means having valve means controlling an air conditioning media flow; damper means to control a flow of air from return air path means and outside air path means through said unit ventilator means to utilize said media flow to temper said air flow; pneumatic thermostat means having an inlet with connection means connected to a three level source of air pressure; said thermostat means further having a controlled air outlet; dual pressure relay means having a first pressure responsive section connected to said source of air pressure; said relay means having a second pressure responsive section connected to said controlled air outlet; said air outlet connected to said valve means and said damper means to operate said damper means and said valve means; a first air pressure from said source to said thermostat means and said relay means jointly controlling said damper means so that said outside air path means is closed while said thermostat means controls said tempered air flow at a first temperature; a second air pressure from said source to said thermostat means and said relay means jointly controlling said damper means so that said outside air path means is closed while said thermostat means controls said tempered air flow at a second temperature; and a third pressure from said source to said thermostat means and said relay means jointly controlling said damper means so that a mixture of return and outside air flows through said unit ventilator means while said thermostat means controls said tempered air flow at said second temperature.

5. A pneumatic temperature control system for a unit ventilator, including: a unit ventilator having a valve controlling an air conditioning media flow through said unit ventilator; damper means to control a flow of air from a return air path and an outside air path through said unit ventilator to utilize said media flow to temper said air flow; pneumatic control means including a pneumatic thermostat and connection means connected to a three level source of air pressure; said control means further connected to said valve to operate said valve; a dual pressure to electric relay operating switch means at two different preset pressures connected to said control means and said damper means; a first air pressure from said source to said thermostat and said relay jointly controlling said damper means so that said outside air path is closed while said thermostat controls said tempered air flow at a first temperature by operating said valve; a second air pressure from said source to said thermostat and said relay operating said switch means at a first said preset pressure thereby jointly controlling said damper means so that said outside air path is closed while said thermostat controls said tempered air flow at a second temperature; and a third pressure from said source to said thermostat and said relay operating said switch means at a second said preset pressure thereby jointly controlling said damper means so that a mixture of return and outside air flows through said unit ventilator while said thermostat controls said tempered air flow at said second temperature.

6. A pneumatic temperature control system for unit ventilator means, including: unit ventilator means having valve means controlling an air conditioning media flow; damper means to control a flow of air from return air path means and outside air path means through said unit ventilator means to utilize said media flow to temper said air flow; pneumatic control means including pneumatic thermostat means and connection means connected to a three level source of air pressure; said control means further connected to said valve means; dual pressure to electric relay means connected to said control means and said damper means; a first air pressure from said source to said thermostat means and said relay means jointly controlling said damper means so that said outside air path means is closed while said thermostat means controls said tempered air flow at a first temperature; a second air pressure from said source to said thermostat means and said relay means jointly controlling said damper means so that said outside air path means is closed while said thermostat means controls said tempered air flow at a second temperature; and a third pressure from said source to said thermostat means and said relay means jointly controlling said damper means so that a mixture of return and outside air flows through said unit ventilator means while said thermostat means controls said tempered air flow at said second temperature.

7. A pneumatic temperature control system for unit ventilator means, including: unit ventilator means having control means controlling an air conditioning media flow; damper means to control a flow of air from return air path means and outside air path means through said unit ventilator means to utilize said media flow to temper said air flow; pneumatic control means including pneumatic thermostat means and connection means connected to a three level source of air pressure; relay means connected to said pneumatic control means and said damper means; a first air pressure from said source to said thermostat means and said relay means jointly controlling said damper means so that said outside air path means is closed while said thermostat means controls said tempered air flow at a first temperature; a second air pressure from said source to said thermostat means and said relay means jointly controlling said damper means so that said outside air path means is closed while said thermostat means controls said tempered air flow at a second temperature; and a third pressure from said source to said thermostat means and said relay means jointly controlling said damper means so that a mixture of return and outside air flows through said unit ventilator means while said thermostat means controls said tempered air flow at said second temperature.

References Cited by the Examiner

UNITED STATES PATENTS

| | | | |
|---|---|---|---|
| 2,334,445 | 11/1943 | Seelbach | 236—49 |
| 2,727,691 | 12/1955 | Alyea | 236—38 |

EDWARD J. MICHAEL, *Primary Examiner*.